US006414262B1

United States Patent
Rao

(10) Patent No.: US 6,414,262 B1
(45) Date of Patent: Jul. 2, 2002

(54) METHOD AND APPARATUS FOR LASER SPLICING OF OPTICAL FIBERS

(75) Inventor: Mukkamala Kameshwar Rao, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 09/433,113

(22) Filed: Nov. 3, 1999

(51) Int. Cl.[7] ............................................... B23K 26/00
(52) U.S. Cl. ................................................ 219/121.63
(58) Field of Search ....................... 219/121.63; 385/96, 385/95, 97, 98

(56) References Cited

U.S. PATENT DOCUMENTS

| 4,604,119 A | * | 8/1986 | Kuhl et al. .................. 65/4.21 |
| 5,299,274 A | * | 3/1994 | Wysocki et al. .............. 385/96 |
| 5,631,989 A | * | 5/1997 | Koren et al. .................. 385/91 |
| 5,682,453 A | * | 10/1997 | Daniel et al. ................. 385/99 |
| 6,085,004 A | * | 7/2000 | Dower et al. ................. 385/80 |

OTHER PUBLICATIONS

Seippel R.G. Optoelectronics for Technicians & Eng. Prentice Hall NJ, 1989.*
Optoelectronics for Technicians and Engineering by Robert G. Seippel, 1989, Prentice Hall Career & Technology, Englewood Cliffs, New Jersey 07632.

* cited by examiner

Primary Examiner—M. Alexandra Elve
(74) Attorney, Agent, or Firm—William J. Sapone; Coleman Sudol Sapone, P.C.

(57) ABSTRACT

A method and apparatus for fusing a pair of optical fibers together using an intense beam of electromagnetic radiation directed against the aligned ends of the optical fibers. The intense beam is of a power sufficient to fuse the fibers together, and is applied for a time sufficient to effect joining of the fibers. Preferably, the beam is of a sufficiently high intensity to create a plasma which increases the amount of optimal power absorbed by the fiber ends.

19 Claims, 5 Drawing Sheets

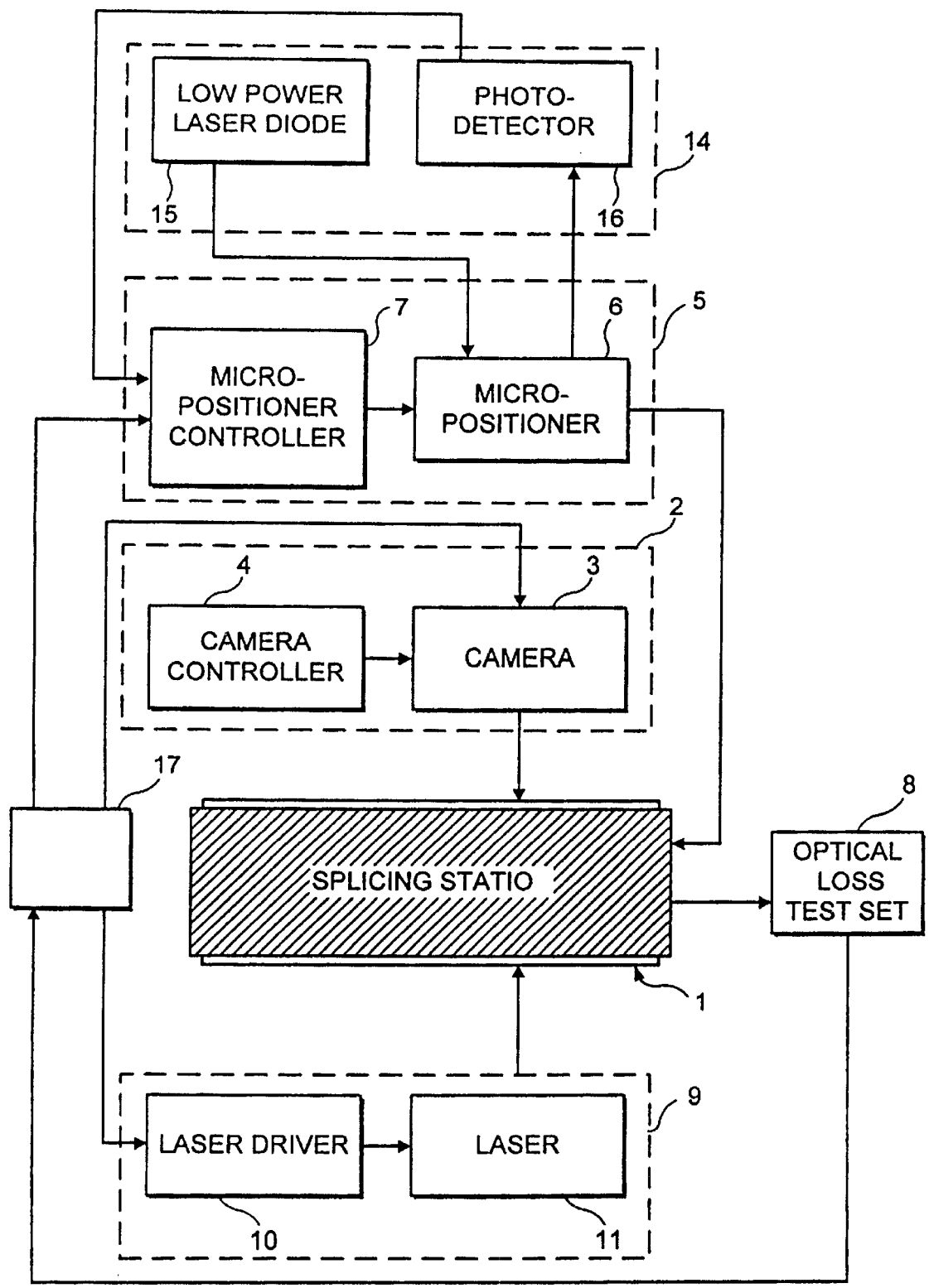
F I G. 1

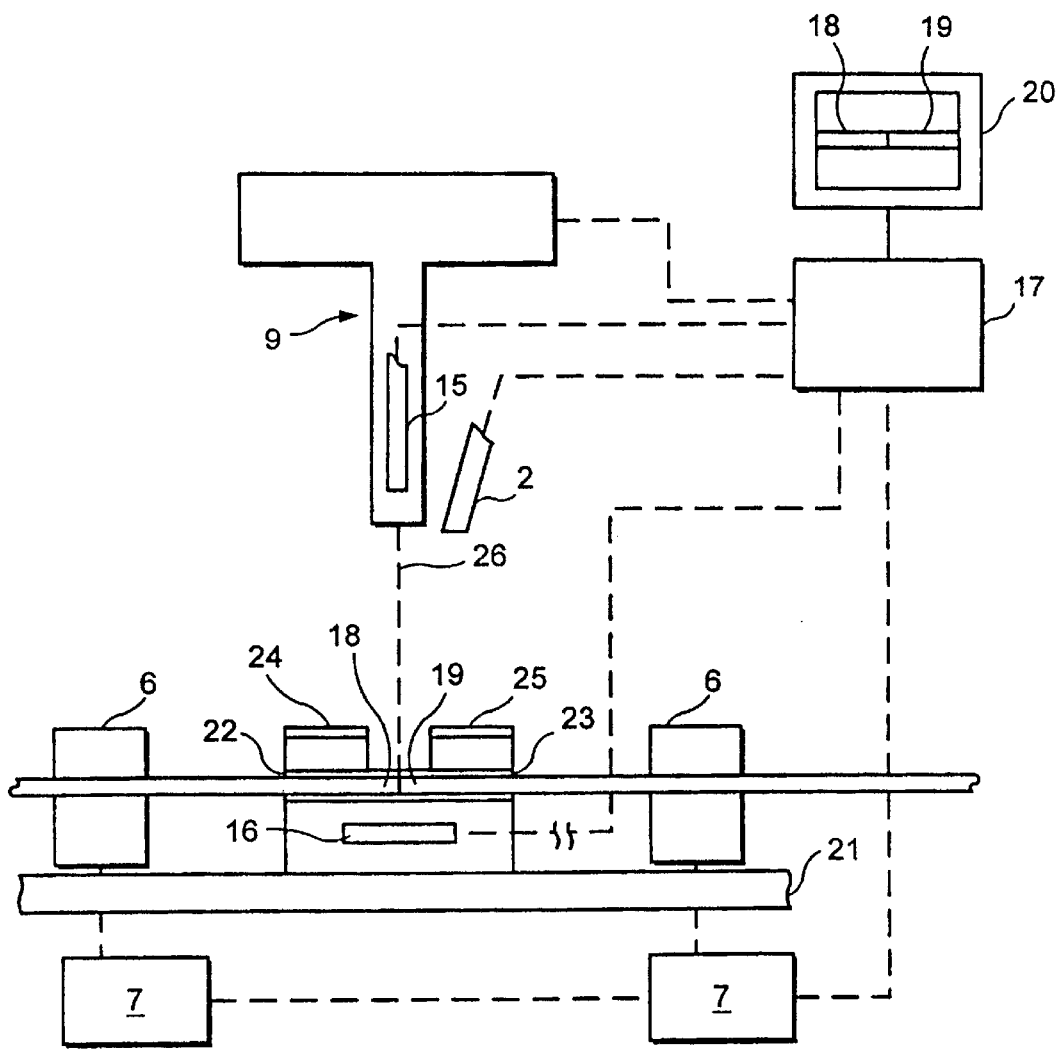
F I G. 2

Epoxy Curing Time vs Power using $CO_2$ Laser

Relative Spliced Loss of Fibers

METHOD AND APPARATUS FOR LASER SPLICING OF OPTICAL FIBERS

TECHNICAL FIELD

This invention relates to the splicing together of ends of a pair of optical fibers using an intense beam of laser radiation.

BACKGROUND

There has been heavy growth in the area of optoelectronics and particularly in the utilization of optical fibers as the preferred medium for carrying heavy communication loads over long distances and safely past strong sources of electronic interference. Such optical fibers have low-loss capabilities, the optical transmission path providing electrical input and output isolation in a light weight and low cost cable, while avoiding susceptibility to electromagnetic induction effects.

An optical fiber comprises a first transparent dielectric cylinder surrounded by a second transparent dielectric cylinder, light transported by a series of reflections from wall to wall off an interface between the inner cylinder (the core) and the outer cylinder (the cladding). The reflections are made possible by a high refractive index of the core material and a lower refractive index of the cladding material, such that light is transported from a light source to a light detector. These cylinders are typically covered by a protective plastic jacket and there may also be included strengthening members which surround and further protect the optical fiber. Multiple optical fiber cables are also used.

Provision must be made for joining optical fiber cables together as joints are frequently employed in long haul fiber links as well as in local area networks (LAN) to form a permanent joint between fibers in the field. However, coupling optical fibers can result in various losses such as through misalignment of the fiber ends, gap losses, etc.

Proper joining, preferably by splicing of the ends, is imperative to achieving high performance from an optical fiber link. Such fiber splicing is currently performed by arc-fusion or mechanical splicing techniques. In arc-fusion splicing, an electric arc is employed to provide localized heating at the interface between two butted, pre-aligned fiber ends causing them to soften and fuse. In mechanical splicing, fibers are held in alignment by some mechanical means (such as special tubes, grooves, etc.) and optical epoxies are injected at the fiber joint to splice the fibers. However, current splicing methods often restrict the quality of the joint and thus can degrade the transmitted signal. For example, the use of arcing electrodes may cause contamination of the joint. Further, the time required to obtain a joint is excessive.

Although lasers are extensively used in many applications such as welding, soldering, marking, etc., their potential for splicing optical fibers has not been exploited. This is partly due to the difficulty in determining the appropriate parameters for laser splicing and partly because of problems with process implementation due to small fiber size (diameter of about 100 microns), complicated further because the fiber is itself transparent to light and absorption of laser light into the fiber is very small. As such, melting of the fiber ends may not occur easily and if some melting does occur, it is difficult to assure uniformity. Consequently, successful commercial laser splicing of optical fibers has not been achieved.

SUMMARY OF THE INVENTION

It is an object of the present invention to provide a method for fusing optical fiber ends rapidly and with low distortion.

It is a further object to provide a method for fusing optical fiber ends with a precise heat source to minimize defects.

It is another object to provide a method for fusing optical fiber ends that is rapid, easy to use and adaptable for use in remote field locations with low power consumption.

It is yet another object to provide a field usable apparatus for fusing optical fiber ends using a laser as the heat source.

It is another object to provide a method and apparatus for the rapid epoxy fusing of the ends of a pair of optical fibers.

These and other objects of the invention are achieved by a method for fusing the ends of a pair of optical fibers together comprising:

providing two optical fiber ends, placing the two optical fiber ends in coaxial alignment, such that the ends are in contact and applying an intense beam of electromagnetic radiation to the contacted ends in an amount sufficient to effect melting and fusing of the fiber ends.

In one embodiment of the invention, the beam of electromagnetic radiation is a laser beam that is of sufficient intensity so as to create a plasma effect during fusing.

According to conventional thinking, light dissipation at the point of irradiation should result in erratic performance, distortion and/or higher attenuation. It has been discovered that a laser operating at specified parameters can achieve a plasma effect which results in high energy absorption, resulting in an excellent fiber joint, with low power consumption.

The apparatus of the invention comprises means for coaxially aligning two optical fiber ends, means for generating an intense beam of electromagnetic radiation and means for applying the intense beam of electromagnetic radiation to the aligned fiber ends for a time sufficient to effect fusing of the fiber ends.

Preferably, the apparatus further includes means for observing the fiber ends, means for testing the fused ends to assure optimum performance, and control means for controlling the fusion process.

Most preferably, a computer controlled laser system using laser diodes, a micro positioning system and a CCD camera are used to obtain high quality remote field location optical fiber splices, the system optimally being battery powered.

In another embodiment of the invention, the apparatus includes means for applying a curable joining compound to the fiber ends and access means for applying the beam of electromagnetic radiation to the fiber ends and joining compound to advance the curing process.

BRIEF DESCRIPTION OF THE DRAWINGS

FIG. 1 is a block diagram showing a laser based splicing system according to the present invention.

FIG. 2 is an illustration showing the fusion process of the invention.

DETAILED DESCRIPTION OF THE INVENTION

Figure 3:
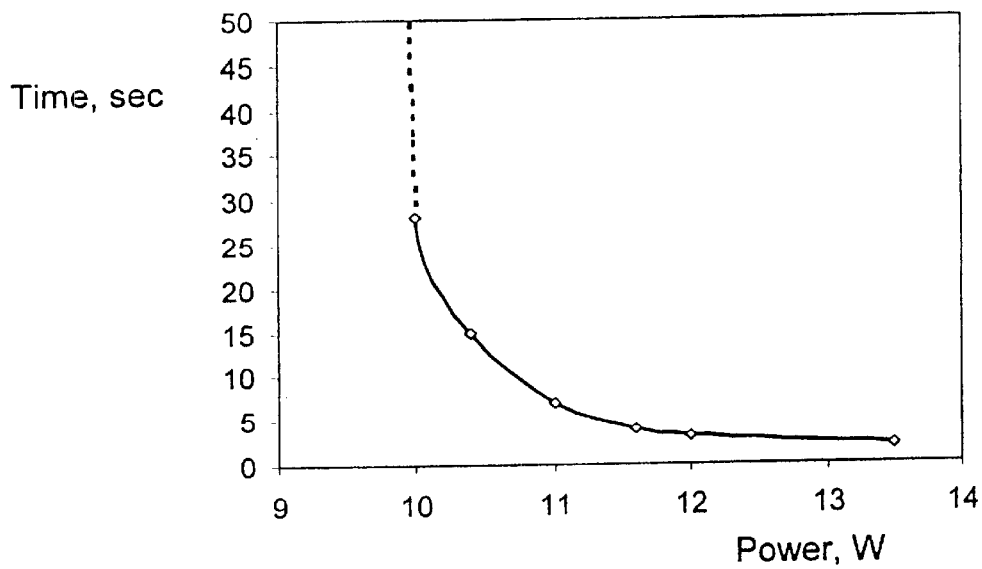
FIG. 3 is a graph showing the maximum power limit for a continuous wave $CO_2$ laser versus time.

Referring to FIG. 1, a block diagram illustrates a field usable splicing station 1 according to the present invention.

Prior to explaining the inventive system, it should be understood that the fiber ends need to be prepared for joining using the well known techniques for removing the protective covering, cutting, polishing, etc, and because these steps are known, they are not repeated in this application. The splicing station 1 has several subsystems. These include an imaging subsystem 2, which has a camera 3, preferably a CCD camera, and a camera controller 4 which directs the camera 3. The camera is used to view the fiber ends during the fiber alignment and splicing process.

The station 1 further includes a fiber positioning subsystem 5 which has a pair of micro-positioners 6 which grip the pair of fibers to be spliced, and a pair of corresponding micro-position controllers 7 that directs the micro-positioners to move in response to input from a user viewing the fiber ends, to move the fiber ends into alignment.

A loss measurement subsystem 8 is used to measure the loss through the joint after fusion. This may utilize an optical loss test or determine loss based on macro-bending. Of course, other tests could also be used and the invention is not limited to these test methods.

A laser gun assembly 9 comprises a laser driver 10, a laser source 11, a lens assembly 12 and a delivery system 13. Various lasers may be used, for example, $CO_2$ lasers, Nd:YAG lasers (Neodymium in a host crystal of yttrium aluminum garnet), excimer lasers, HeCd (Helium-Cadmium) or semiconductor/diode lasers. Continuous wave or pulsed outputs can be used, though pulsed output is preferred. Of course, while the term "laser" is used, it will be understood that any intense beam of electromagnetic radiation that is of sufficient power to fuse the fiber ends could be used in the present invention.

A laser gun alignment system 14 is integrated with the fiber positioning subsystem. The laser gun alignment system utilizes a low power laser diode 15 and a photo detector 16 for precisely positioning the laser beam on the fiber ends to be spliced. The diode issues a low power beam that is used to target the fiber ends, allowing position adjustment of the high energy laser gun prior to fusing.

A computer system 17, that can be a standard notebook or laptop computer, controls the laser gun alignment system, CCD camera controller and laser driver, receiving information from the camera and loss measurement system to confirm that the fused fiber ends have low-loss characteristics.

Referring to FIG. 2, the imaging subsystem 2 is used to view the fiber ends 18 and 19 on a monitor 20. The computer system 17 is used to direct the micro-position controllers 7 to position the fiber ends, clamped in the micro-positioners 6, in coaxial alignment. The computer system then activates the laser gun alignment system 14, powering the laser diode 15 and receiving a signal from the photo detector 16. The computer system then directs the laser alignment system to move into the optimum alignment with the fiber ends, thus simultaneously aligning the laser gun assembly 9. The computer system 17 then sets the laser gun power, sets the exposure time, initiates laser firing for the selected exposure time, and then tests the joint using the loss measurement subsystem 8.

A system utilizing various high power laser sources has been evaluated which confirmed that laser splicing with high energy and short pulse duration provides high quality fiber joining in a minimum amount of time. Contrary to the expected energy dissipation, utilizing an intense electromagnetic beam that induces a plasma effect, causes a substantial increase in the absorbed optical power by the fiber to effect rapid high quality fusion with low power consumption. This overcomes a problem with currently available lasers which emit energy at wavelengths that are subject to low absorption by the optical fiber. The plasma causes a significant increase in the absorption of the laser radiation at low absorption wavelengths.

While the plasma effect can occur with continuous wave lasers, the effect is more pronounced in the pulsed mode of operation. This is detected as a sudden increase in adsorption of the laser power at the fiber joint. For a diode laser operated in CW mode, at 820 nm, plasma generation occurs at power levels above 35 W. In pulsed mode, the peak power is in the KW range, though the average power is very small due to the small pulse width and duty cycle. Of course these power levels may vary with other laser and/or fusing parameters. Any beam of electromagnetic radiation that can produce the plasma effect could of course be used in the present invention.

Various lasers and power levels were evaluated to confirm successful fiber splicing utilizing the present invention. The splice performance and properties were determined by studying laser power, wavelength, and continuous/pulsed mode of operation, laser pulse width, pulse repetition rate, duty cycle etc. A closed loop piezoelectric micro-positioner with active feedback was used for fiber alignment. These are preferably piezo-electric micro-positioners which have a resolution/accuracy in the nanometer range. These devices typically have a coarse adjustment range of 4 mm, with a resolution of 1 $\mu$m, and a fine adjustment range of 300 $\mu$m, with a resolution of 50 nm. A high-resolution CCD camera was used for viewing of the fiber ends during the splicing process. After laser splicing, the splice joints were examined using optical/electron microscopes to identify any structural defects of the irradiated fibers. The attenuation of the splice joint was estimated using (i) optical return loss measurement (ii) fiber image profile analysis and (iii) macro-bending techniques. These tests established the effectiveness of laser splicing utilizing specific process parameters of silica fibers (both multimode and singlemode) and polymer fibers.

The following lasers were employed:
$CO_2$ Laser (Wavelength=10.6 $\mu$m)
Nd:YAG laser(Wavelength=1.06 $\mu$m)
Excimer laser(Wavelength=248 nm)
He-Cd Laser(Wavelength=385 nm)
Diode Laser(Wavelength=82 nm, 850 nm and 950 nm)

Single and multi-mode silica fibers were laser spliced, with close to 500 fiber pairs spliced under various operating parameters from each of the above laser sources.

$CO_2$, Nd:YAG and Diode Lasers

A $CO_2$ laser has a typical energy conversion efficiency of 10%. A chief advantage of using a $CO_2$ laser for splicing of silica fibers is its operating wavelength of 10.6 $\mu$m, which gives an absorption of around 10 dB/$\mu$m in silica, compared to the 1–2 dB/km absorption for Nd:YAG laser. For the available diode lasers, the absorption in silica is between 0.16 dB/km to tens of dB/km depending on their emission wavelength. However, when silica fibers are irradiated with a high power Nd:YAG or a laser diode, a significant increase in absorption is observed, most likely due to plasma generation within the bulk of the fiber material above certain threshold power levels. Laser diodes are preferred as these offer benefits such as improved light emission efficiency, low voltage operation, electronic control compatibility, small size, and low weight.

Using a $CO_2$ laser (Synrad Model 48-1-28 and Coherent Diamond 84, 250 W), 500 fiber pairs have been exposed under various operating parameters from the laser, both in continuous and pulsed mode of operation, to identify the range of parameters suitable for splicing. The dependence of time to splice was also determined with various laser parameters, to determine the optimum speed of the splicing process. Attenuation measurements were performed on 100 fiber pairs to confirm successful splicing at various laser parameters.

Figure 7:
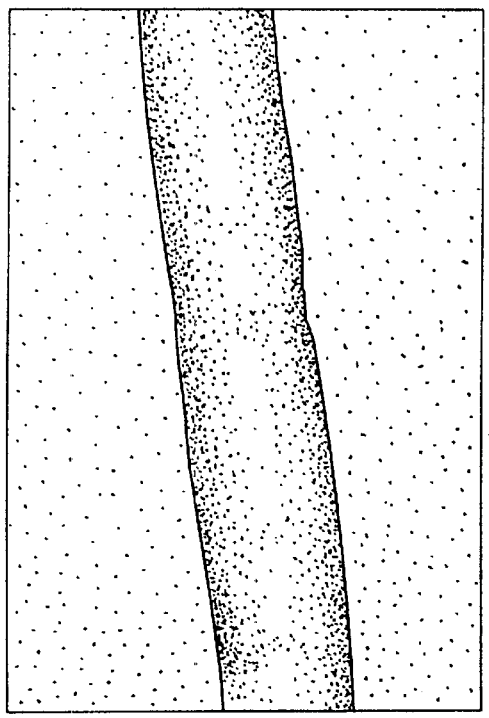
FIG. 7 is a photograph of a laser spliced fiber joint.

A plot of the maximum power limit (beyond which the fiber will evaporate or melt down due to excessive heating) for fiber splicing with continuous wave (CW) $Co_2$ laser radiation, is shown in FIG. 3 and indicates that the maximum laser power for splicing is dependent on the exposure time. The power range was from about 13.5 W to 30 W, with an exposure time of from about 28 sec to about 1 sec respectively. Power levels below 10 W either require too long exposure time or do not cause sufficient melting to obtain a fused joint. A photograph of a typical laser-spliced fiber joint is illustrated in FIG. 7.

Figure 4:
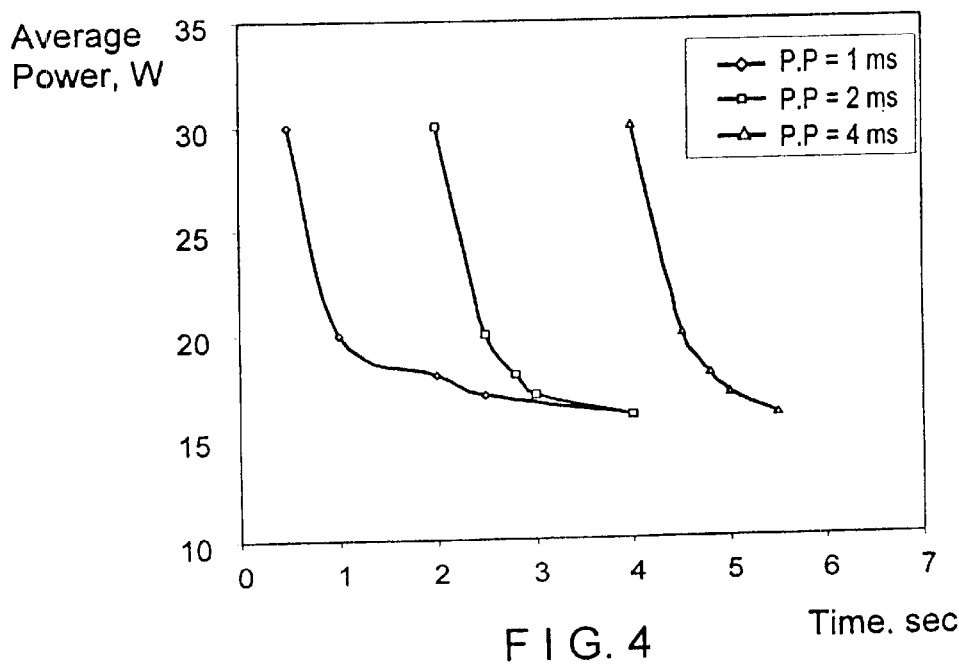
FIG. 4 is a graph showing the effect of using a pulsed $CO_2$ laser illustrating the dependence of the maximum power limit on exposure time.

Spliced fibers obtained using pulsed $CO_2$ laser radiation are shown in FIG. 4, which indicates the dependence of maximum power limit on exposure time as well as on pulse period (P.P.). With a pulse period of 4 ms, the maximum power ranged from about 15 to 30 W, with an exposure time of about 5.5 to about 4 sec respectively. For a pulse period of 2 ms, at the same power range, the exposure time reduced to about 2–4 sec, respectively. At a pulse period of 1ms, for the same power range, the exposure time reduced to from less than 1 sec to about 4 sec, the wider range attributable at the higher power levels to the plasma effect. There is a significantly higher absorption at the high power levels, at a high pulse rate.

Figure 5:
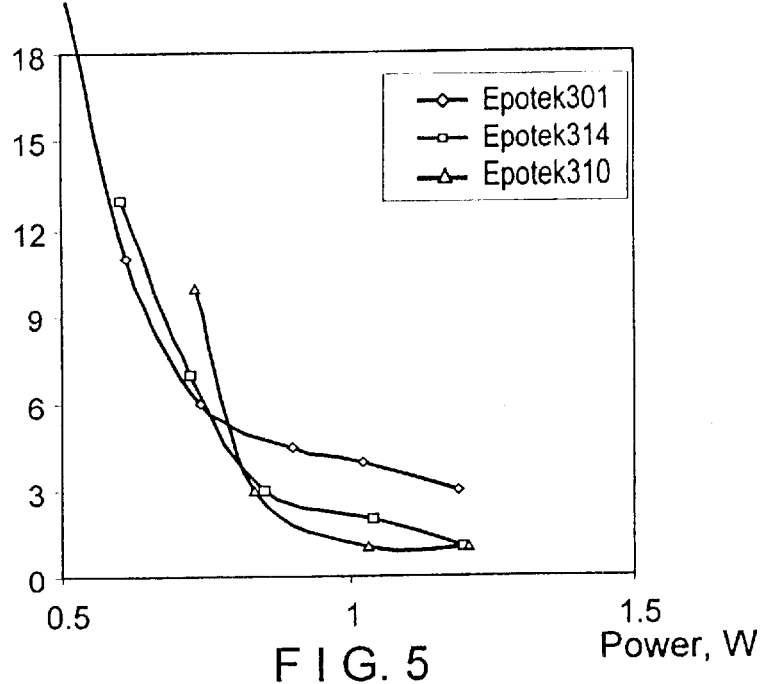
FIG. 5 is a graph showing the laser splicing of an epoxy based joint illustrating the effect of maximum power versus epoxy curing time.

In addition to direct fiber-to-fiber laser splicing, laser splicing of fibers using optical epoxies (Epotek 301, 310 and 314) injected between the fiber pairs has also been achieved. In this embodiment of the invention, a curable joining compound is applied to the aligned fiber ends. Again, the energy beam is aligned with the fiber ends. However, since fusion will be effected by curing the joining compound, the computer system sets the laser for a low power level, and adjusts the exposure time to advance the curing process without fiber melting. For laser splicing of fibers using epoxies, the dependence of epoxy curing time on laser power is shown in FIG. 5. One striking feature of the epoxy splicing using laser enhanced curing is that it requires a considerably lower amount of laser power, about 1.5 W or less, and is faster than the conventional epoxy splicing technique, providing a cured joint at from about 1 to about 18 seconds. Conventional epoxy techniques generally require from 1 to 3 min.

Figure 6:
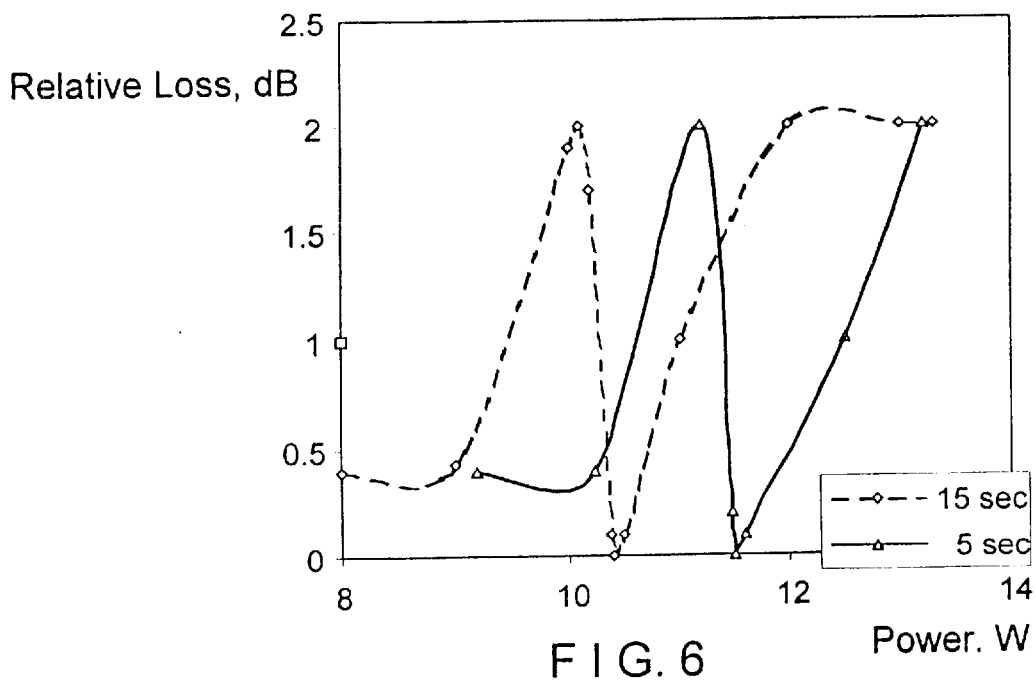
FIG. 6 is a graph showing the variation of attenuation as a function of laser power and exposure time.

The variation of attenuation for laser spliced fibers as a function of laser power and exposure time is shown in FIG. 6. The two attenuation curves show similar patterns. For low laser power levels, the loss is very close to Fresnel loss and for power levels which are not of optimum value, the splice loss is significantly higher. This may be due to improper melting and subsequent structural imperfections developed in the fiber joint. However, the curves do show that with optimum splicing parameters, the relative splice loss can be minimized.

Similar investigations have been carried out with Nd:YAG and diode lasers. For these lasers, no significant melting (and splicing) of fibers is observed below a certain threshold power. For Nd:YAG laser (from Fox labs and NEC M690B) the threshold power is found to be dependent on the laser beam diameter. Splicing could be achieved at CW power levels of 4 W–10 W and splicing at lower power levels may be possible using a small beam diameter Nd:YAG laser. By using a NEC M690B laser with the pulsed mode of operation, a splice joint has been achieved with the following parameters:

|    | PEAK POWER | AVERAGE POWER | BEAM WIDTH | PULSE REPETITION RATE | TIME |
|----|------------|---------------|------------|----------------------|------|
| 1. | 13.0 kW    | 3.9 W         | 100 ns     | 3 kHz                | 60 s |
| 2. | 13.3 kW    | 2.0 W         | 50 ns      | 3 kHz                | 60 s |
| 3. | 13.0 kW    | 2.6 W         | 50 ns      | 4 kHz                | 60 s |

Figure 8:
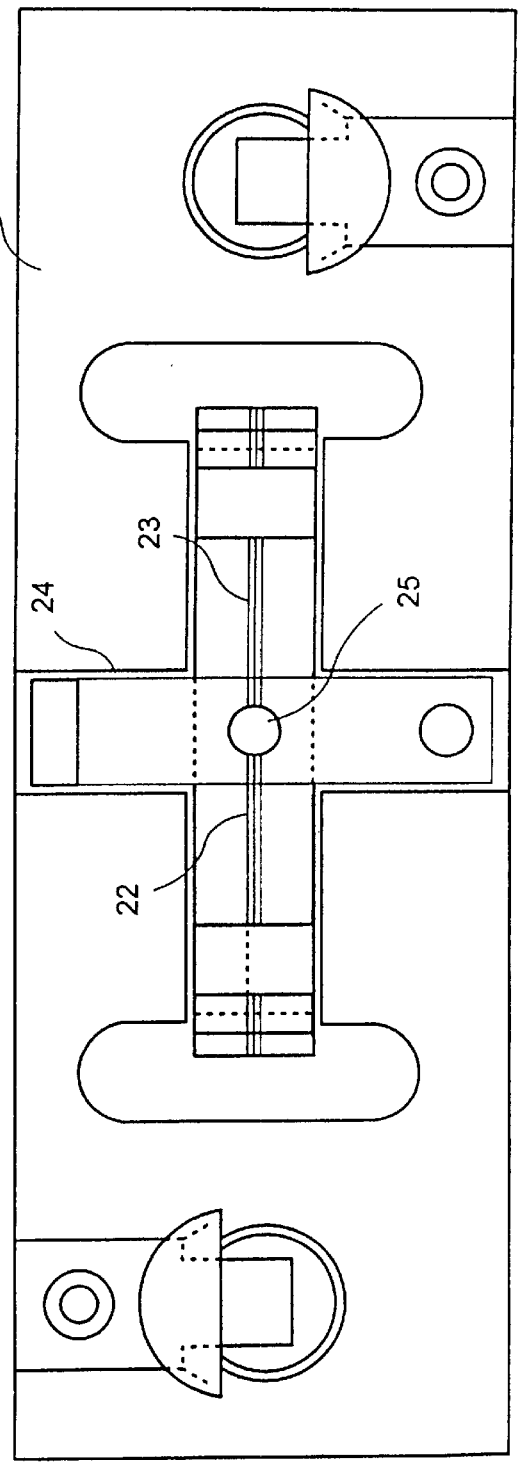
FIG. 8 is a view of a fiber alignment tool.

One important factor is the alignment of the laser-beam with respect to the fiber to ensure that maximum power is received by the fiber. Referring to FIG. 8, a tool 21 for aligning a pair of optical fibers is shown. The tool 21 has a pair of high precision V-shaped grooves 22 and 23 which receive the pair of optical fibers, the grooves having a tolerance of <1 μm. The micro-positioners 6 thus move the fibers along a single axis, defined by the axis of the grooves until the fiber ends are abutted, as shown in FIG. 2. A hinged cover 24 is then closed over the aligned fibers, the cover having an opening 25 for admission of a high energy beam 26 to the site of the joint. Such a tool provides a rapid alignment of the fiber ends for fusion, and can also be used to effect the epoxy fusion process described above.

Diode lasers have many advantages and are a preferred radiation source. High power diode lasers operating at 820 nm (16 W), 850 nm (40 W) and 950 nm (80 W) have been used to splice fibers. With 35 W of CW power, exposing the fibers for 2 minutes at 850 nm or 940 nm can form a good splice. Splicing could be achieved at higher power levels (>35 W) and shorter exposure times. No splice is achieved at power levels below 30 W. The laser diodes can be operated in CW mode, however they are preferably operated in pulsed mode and a high power pulsed laser diode, is preferred. While 820/850/950 nm laser diodes may be used because they are easily available, these wavelengths are not exclusive for splicing applications, and longer wavelength laser diodes which are now becoming more readily available can be used to provide high quality laser splices with even lower exposure time.

Utilizing the present invention, an optical fiber joint is obtained that is of high quality in a significantly shorter time period. Particularly where the intense energy beam is pulsed over a short duration to assure obtaining a plasma effect, excellent joints are achieved. The apparatus of the invention is portable, and can be battery powered so that effective splices are obtained even at remote locations.

While preferred embodiments of the present invention have been shown and described, it will be understood by those skilled in the art that various changes and modifications could be made without varying from the scope of the present invention.

I claim:

1. An apparatus for producing a fusion joint between a pair of ends of two optical fibers comprising:
   means for coaxially aligning the pair of fiber ends and for holding the fiber ends in coaxial alignment;
   means for generating an intense beam of electromagnetic radiation of an intensity sufficient to produce a plasma;
   means for directing the intense beam of electromagnetic radiation to the aligned fiber ends and for applying the intense beam of electromagnetic radiation for a time sufficient to produce a plasma to effect fusing of the fiber ends.

2. The apparatus of claim 1 further comprising means for obtaining a viewable image of the fiber ends.

3. The apparatus of claim 1 further comprising means for testing the fused fiber ends for optical losses and defects.

4. The apparatus of claim 1 wherein the means for coaxial alignment comprise at least one micro-positioner and at least one micro-positioner controller.

5. The apparatus of claim 1 wherein the means for generating an intense beam electromagnetic radiation is a continuous wave or pulsed wave beam having an average power of at least 10 W.

6. The apparatus of claim 1 further comprising computer means connected to and controlling the means for coaxially aligning the pair fiber ends, the means for generating the radiation beam and the beam directing means.

7. The apparatus of claim 1 further comprising means for receiving a curable joining compound about the aligned fiber ends, the intense beam of electromagnetic radiation promoting curing of the joining compound to effect fusing of the fiber ends.

8. The apparatus of claim 1 wherein the means for directing the intense beam of electromagnetic radiation comprises a laser driver, a laser source, a lens system, and a means for aligning the laser precisely over the aligned fiber ends.

9. The apparatus of claim 1 wherein the means for generating the intense beam of electromagnetic radiation is a laser selected from the group consisting of a $CO_2$ laser, a Nd;YAG laser, an Excimer laser, a HeCd laser or a semiconductor/diode laser.

10. A method for fusing the ends of a pair of optical fibers together comprising:

providing the optical fiber ends;

placing the two optical fiber ends in a coaxial alignment;

applying an intense beam of electromagnetic radiation to the fiber ends at a power level and pulse period sufficient to generate a plasma and for a time sufficient to produce the plasma to effect fusing of the fiber ends.

11. The method of claim 10 further comprising obtaining a viewable image of the fiber ends.

12. The method of claim 10 further comprising testing the fused fiber ends for optical losses and defects.

13. A method of claim 10 further comprising applying a curable joining compound to the aligned fiber ends and applying the intense beam for a time sufficient to cure the joining compound and fuse the fiber ends together.

14. The method of claim 10 wherein the intense beam of electromagnetic radiation has an average power of at least 10 W.

15. The method of claim 10 wherein the intense beam of electromagnetic radiation is applied for from about 1 to about 30 seconds.

16. The method of claim 13 wherein the intense beam of electromagnetic radiation has an average power of about 0.5 to about 1.5 W and is applied for from about 1 to about 20 seconds.

17. The method of claim 10 wherein the intense beam of electromagnetic radiation is provided by a laser.

18. The method of claim 10 wherein the intense beam of electromagnetic radiation is provided by a laser selected from the group consisting of a $CO_2$ laser, a Nd:YAG laser, and Excimer laser, a HeCd laser or a semiconductor/diode laser.

19. A portable apparatus for fusing a pair of ends to two optical fibers in remote locations comprising:

a portable housing comprising:

a) micro-positioner means for precisely aligning the pair of fiber ends and for holding the fiber ends in coaxial alignment;

b) laser diode means for generating an intense pulsed beam of electromagnetic radiation at an intensity sufficient to produce a plasma;

c) means for targeting the intense beam of electromagnetic radiation on the aligned fiber ends;

d) means for imaging the aligned fiber ends; and, portable computer means connected to the housing for recognizing the image from the means for imaging, for controlling the micro-positioner means and laser diode means and for applying the pulsed beam of electromagnetic radiation at a power level and a pulse duration sufficient to produce a plasma for fusing the optical fiber ends together.

* * * * *